(12) United States Patent
Carter (10) Patent No.: US 7,130,898 B2
(45) Date of Patent: Oct. 31, 2006

(54) MECHANISM FOR FACILITATING INVOCATION OF A SERVICE

(75) Inventor: Frederick H. Carter, Fremont, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 740 days.

(21) Appl. No.: 09/940,280

(22) Filed: Aug. 27, 2001

(65) Prior Publication Data

US 2003/0055875 A1 Mar. 20, 2003

(51) Int. Cl.
*G06F 15/173* (2006.01)
*G06F 15/177* (2006.01)
*G06F 15/16* (2006.01)
*G06F 15/167* (2006.01)

(52) U.S. Cl. .................. 709/223; 709/220; 709/202; 709/228

(58) Field of Classification Search ................ 709/200, 709/223, 201, 202, 203, 220, 222, 221, 228, 709/238; 715/514; 717/100; 718/100, 10
See application file for complete search history.

(56) References Cited

U.S. PATENT DOCUMENTS

| | | | |
|---|---|---|---|
| 5,574,782 A * | 11/1996 | Baird et al. ............ | 379/221.09 |
| 6,260,050 B1 * | 7/2001 | Yost et al. ................ | 709/201 |
| 6,317,786 B1 * | 11/2001 | Yamane et al. ............ | 709/224 |
| 6,687,733 B1 * | 2/2004 | Manukyan ................ | 709/200 |
| 2002/0010764 A1 * | 1/2002 | Spicer ..................... | 709/220 |
| 2002/0178254 A1 * | 11/2002 | Brittenham et al. ........ | 709/224 |
| 2002/0184349 A1 * | 12/2002 | Manukyan ................ | 709/221 |
| 2003/0061404 A1 * | 3/2003 | Atwal et al. .............. | 709/228 |
| 2003/0233477 A1 * | 12/2003 | Ballinger et al. .......... | 709/246 |
| 2004/0205613 A1 * | 10/2004 | Li et al. .................. | 715/523 |

* cited by examiner

*Primary Examiner*—Bharat Barot
*Assistant Examiner*—Benjamin R. Bruckart
(74) *Attorney, Agent, or Firm*—Hickman Palermo Truong & Becker LLP; Christopher J. Brokaw (57) ABSTRACT

An application proxy is disclosed for shielding the complexities of invoking a service from a higher level mechanism, such as a process engine. The application proxy comprises a proxy engine and one or more sets of protocol logic. Each set of protocol logic implements a particular protocol that may be used to invoke services on service applications. The protocols implemented by the sets of protocol logic may be standard protocols (e.g. SOAP (Simple Object Access Protocol), ebXML, etc.) implemented by many service applications to enable service invocations. In operation, the application proxy receives a message to perform an activity which calls for the invocation of a service. In response to the message, the application proxy obtains the service definition associated with the service. Based upon the service definition, the proxy engine executes an appropriate set of protocol logic. Using the information in the service definition, the protocol logic generates a service invocation in accordance with the protocol that the protocol logic implements. Once generated, the service invocation is sent to the appropriate service application for processing. In this manner, the application proxy properly invokes the service.

18 Claims, 4 Drawing Sheets

MECHANISM FOR FACILITATING INVOCATION OF A SERVICE

FIELD OF THE INVENTION

This invention relates generally to computer systems, and more particularly to a mechanism for facilitating the invocation of a service.

BACKGROUND

Process automation systems are used in many companies to manage the various business processes that are implemented within those companies. A process automation system may be used, for example, to manage an order fulfillment process to ensure that each and every incoming order is properly handled in accordance with a process set forth by the management of the company. Similarly, a process automation system may be used to manage an expense approval process to ensure that, before an expense is incurred, all of the proper approvals have been obtained.

In a typical process automation system, each process that the system manages is defined by a user (e.g. a manager), and comprises one or more activities. An activity represents an action or operation that is to be performed within the process. An activity may require action on the part of a user (e.g. an approval from a manager), or it may be an automated function (e.g. an automated credit check). Each activity is linked to one or more other activities by relationship information. Relationship information may specify an order in which activities are to be performed (e.g. ship an order after the customer has been billed). Relationship information may also specify decision logic for determining whether to perform an activity (e.g. bill a customer for an order only if the credit check returns a positive result; otherwise, refuse the order). Basically, the relationship information defines a flow for the process. Once the activities and relationship information for a process are fully defined, a process engine can use the process definition to automatically implement and manage the process.

As noted above, some of the activities in a process can be automated functions. These automated functions may be functionality provided by components within the automation system, or they may be services provided by service applications external to the system (e.g. service applications residing on servers outside of the company). When the process engine encounters an activity involving an automated function, the process engine causes that automated function to be invoked. In the case of a service provided by an external service application, this invocation can be somewhat complex. This is because different service applications may expect services to be invoked in different ways. For example, one application may expect a particular set of semantics and message formats to be used when invoking a service, while another application may expect a different set of semantics and message formats. That being the case, in order to properly invoke a service, the process engine needs to know specifically how the service application for that service expects the service to be invoked. For a large number of service applications, each with different requirements, this can require a large amount of additional logic to be implemented by the process engine.

To shield the process engine from the complexity of service invocations, some automation systems implement application proxies. With application proxies, a process engine does not invoke the services on the service applications directly. Instead, the process engine causes the application proxy associated with a service to be invoked. It is then up to the application proxy to invoke the service on the service application in the manner expected by the service application. In this way, the application proxy shields the process engine from the complexities of the service application, which in turn, allows the process engine logic to remain generic.

In one implementation, the functionality of an application proxy is achieved through the application of XSL (eXtensible Stylesheet Language) transformation rules. More specifically, when the process engine encounters an activity which calls for the invocation of a service provided by a service application, the process engine sends out an XML (eXtensible Markup Language) state message. This message is received by an application proxy associated with the service, and is processed by the proxy to generate a command list. To generate the command list, the proxy accesses a set of customized XSL rules for the service that is being invoked, and processes the XML state message with the XSL rules to transform the state message into the command list. Assuming the proper XSL rules are applied to the state message, the command list will comprise all of the proper steps and all of the proper semantics and formats for invoking the service. Once the command list is derived, the proxy executes each of the commands on the command list to invoke the service. The service is thus invoked without requiring the process engine to directly interact with the service application.

This approach is effective for shielding the process engine from the complexities of the service invocation process. However, it has a shortcoming in that it requires customized XSL transformation rules to be written for each different service invocation. Because of this requirement, whenever a new service is added, a new set of XSL rules needs to be developed. Whenever an existing service is changed, an existing set of XSL rules need to be amended. This need to constantly update the XSL rules can lead to increased maintenance cost for the process automation system. Also, writing XSL rules is a difficult task. Even for a person familiar with XSL, developing a set of rules that transforms a state message into a proper command list is no simple matter. As a result, a typical end user cannot configure an application proxy to work with a new service. Because of the difficulty and the high cost of developing and maintaining XSL rules, the current approach to implementing application proxies is less than optimal.

SUMMARY OF THE INVENTION

In light of the shortcomings of the current approach, there is provided in one embodiment of the present invention an improved implementation for an application proxy, which facilitates the invocation of services provided by service applications while at the same time simplifying the service definition process such that a relatively low-skilled end user can perform it.

In accordance with one embodiment of the present invention, an application proxy comprises a proxy engine and one or more sets of protocol logic. In one embodiment, each set of protocol logic implements a particular protocol that may be used to invoke services on service applications. The protocols implemented by the sets of protocol logic may be standard protocols (e.g. SOAP (Simple Object Access Protocol), ebXML, etc.) implemented by many service applications to enable service invocations. Basically, each set of protocol logic has built into it an understanding of a particular protocol. Based upon this understanding, the protocol logic, when invoked by the proxy engine, knows how to interact with a service application to invoke a service on that service application. For example, the protocol logic knows which semantics to use to form a service invocation, which message formats are expected by the service application, and how message exchange should be conducted. Because an understanding of a protocol is already built into the protocol logic, there is no need for customized XSL transformation rules. All a set of protocol logic needs is some basic information about the particular service that it is to invoke. Once it has that, it will do all that is necessary to invoke the service.

In one embodiment, the basic information that a set of protocol logic needs about a service is provided by a user at activity definition time. More specifically, when a user defines an activity that calls for the invocation of a service, the user provides a service definition for that service. The service definition comprises some basic information about the service, such as information on where the service is located and how it can be accessed, information for mapping the attributes of the activity to the parameters used by the service, indication of which protocol is to be used to invoke the service, etc. When it comes time to invoke the service, this information is used by one of the sets of protocol logic to generate a service invocation for invoking the service. As noted above, the information contained in a service definition is fairly basic, both in terms of substance and technical complexity. As a result, a service definition need not be defined by a highly skilled technical specialist but rather may be provided by a relatively low-skilled end user. Hence, the present invention makes it possible for most end users to work with and exploit the capabilities of the application proxy.

In operation, when it comes time to perform an activity that calls for the invocation of a service, a process engine sends out a message indicating that the activity is to be performed. This message is received by an application proxy, and in response, the application proxy obtains the service definition associated with that service. Based upon the service definition, the proxy engine executes an appropriate set of protocol logic. Using the information in the service definition, the protocol logic generates a service invocation in accordance with the protocol that the protocol logic implements. Once generated, the service invocation is sent to the appropriate service application for processing. In this manner, the application proxy properly invokes the service.

DETAILED DESCRIPTION OF EMBODIMENT(S)

Functional Overview

Figure 1:
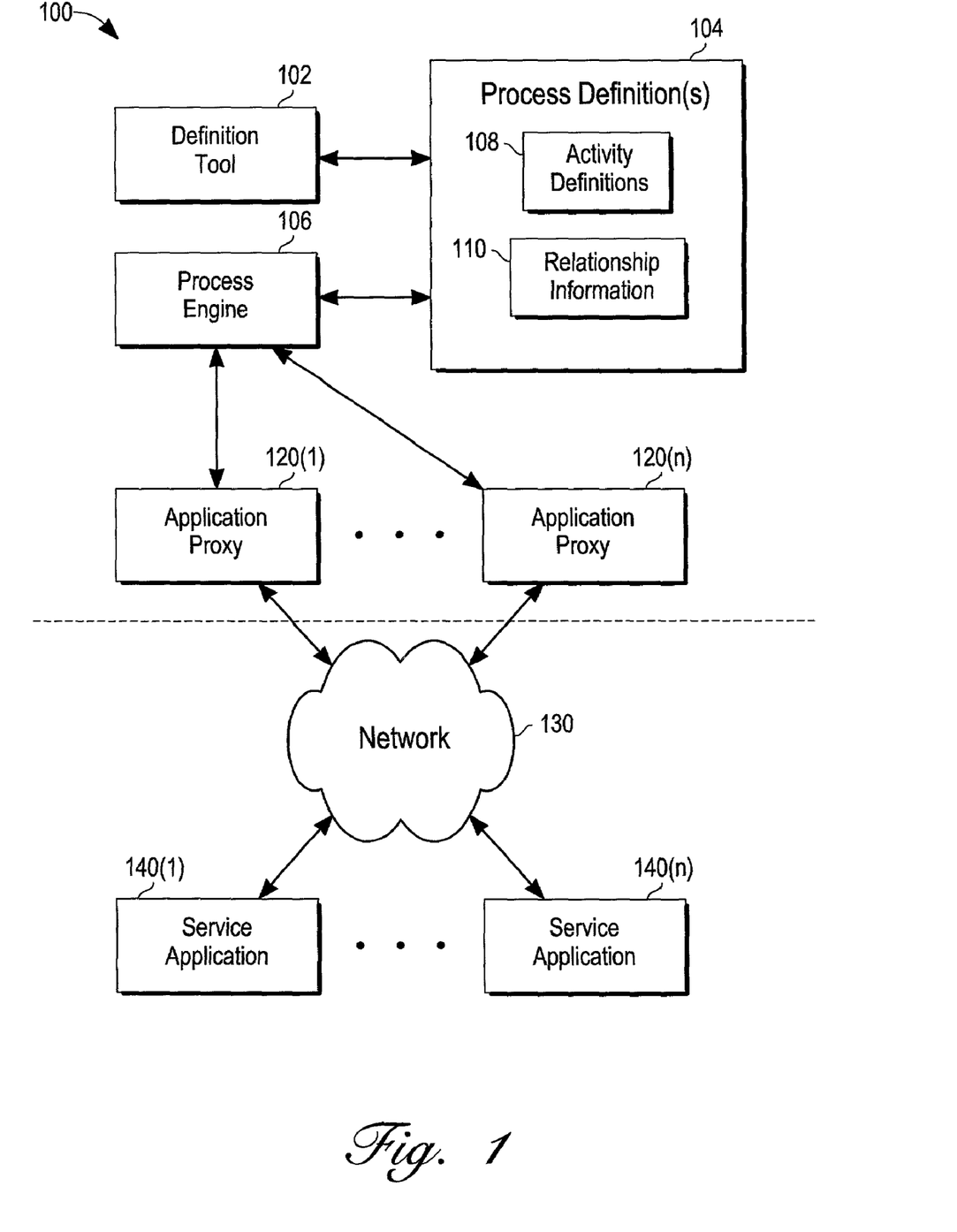
FIG. 1 is a functional block diagram of a process automation system in which one embodiment of the present invention may be implemented.

With reference to FIG. 1, there is shown a functional block diagram of a system 100 in which one embodiment of the present invention may be implemented. For purposes of illustration, an embodiment of the invention will be described in the context of a process automation system, which can be used to manage one or more business processes. However, it should be noted that the invention is not so limited. Rather, the invention may be implemented in any type of system in which it is desirable to invoke one or more services provided by one or more service applications.

As shown in FIG. 1, process automation system 100 comprises a definition tool 102. In one embodiment, tool 102 may be used by a user to define and to specify all of the process definitions 104 for all of the business processes that are implemented by the system 100. In one embodiment, there is a process definition 104 associated with each business process managed by system 100. For example, if the system 100 implements an order fulfillment process, then there will be a process definition 104 for the order fulfillment process. If the system 100 also implements an expense approval process, then there will also be a process definition 104 for the expense approval process. For purposes of system 100, definition tool 102 may be any tool capable of being used to define a process, ranging from a simple text-based tool to a highly sophisticated tool with a graphical user interface. So long as a mechanism enables a user to define all of the necessary components of a process, it may serve as the definition tool 102.

In one embodiment, each business process definition 104 comprises one or more activity definitions 108. An activity represents an action or an operation that is to be performed within a business process. An activity may require action on the part of a user (e.g. an approval from a manager), or it may be an automated function that is to be invoked (e.g. an automated credit check). For an automated function, the function that is to be invoked may be provided by a component (not shown) that is part of the process automation system 100, or the function may be a service that is provided by a service application 140, which may be external to the system 100. Enabling external services to be invoked expands the scope and reach of the process automation system 100. Whatever the activity may be, the definition tool 102 enables the defining user to specify all of the necessary details pertaining to the activity. For example, for an activity that requires action on the part of a user, the definition tool 102 may enable the defining user to specify which user or which user role (e.g. manager) should act on that activity. Similarly, for an activity that calls for the invocation of a service provided by a service application 140, the definition tool 102 may enable the defining user to provide a service definition for the service, which provides basic information relating to the service that will be used in invoking the service. These are just examples of some of the information that may be specified for an activity. Other types and sets of information may also be specified. The process of defining an activity will be described in greater detail in a later section.

In one embodiment, each activity definition 108 in a process is linked to one or more other activity definitions 108 in the process by relationship information 110. Relationship information 110 may specify an order in which activities are to be performed (e.g. ship an order after the customer has been billed). Relationship information 110 may also specify decision logic for determining whether to perform an activity (e.g. bill a customer for an order only if the credit check returns a positive result; otherwise, refuse the order). Basically, relationship information 110 defines a flow for a process. This flow determines if and when the activities in the process are performed. Once all of the activity definitions 108 and the relationship information 110 for a process are fully defined by a user using tool 102, the process definition 104 for that process is complete.

Thereafter, the process engine 106 can use the process definition to automatically implement and manage the process. Using the activity definitions 108, the process engine 106 causes the various activities of the process to be performed. This may involve, for example, soliciting action from one or more users, and/or invoking one or more automated functions. Using the relationship information, the process engine 106 determines if and when to perform the activities. Overall, using the process definition 104 for a process, the process engine 106 controls and oversees the implementation of the process.

Application Proxy

As noted above, one or more of the activities in a process may call for the invocation of a service provided by a service application 140. When such an activity is encountered, the process engine 106 will cause the service to be invoked. As discussed previously, the process of invoking a service on a service application 140 can be fairly complex because each service application 140 may expect its services to be invoked in a different way. To shield the process engine 106 from this complexity, one embodiment of system 100 implements one or more application proxies 120. With the application proxies 120, the process engine 106 need not interact with the service applications 140 directly. Instead, when a service is to be invoked, the process engine 106 causes one of the application proxies 120 to be invoked. It will then be up to the proxy 120 to interact with the proper service application 140 in the proper way to invoke the service. By interacting with the service application 140 in this manner, the application proxy 120 shields the process engine 106 from the complexity associated with invoking services.

In order to properly invoke a service on a service application 140, an application proxy 120, in one embodiment, needs to know how the service application 140 expects its services to be invoked. Since each service application 140 may expect its services to be invoked in a different way, this could require the application proxies 120 to know quite a large amount of information about each service application 140. In recent years, though, a number of industry standard protocols have been developed to simplify the process of invoking services. These standard protocols, which include but are not limited to SOAP (Simple Object Access Protocol) and ebXML, specify the manner in which services on complying service applications 140 are to be invoked. For example, these protocols may specify the semantics that are to be used in a service invocation, the formats that an invocation message is to take, the manner in which message exchange is to take place, etc. With the emergence of these protocols, more and more service applications 140 are now standardizing on the manner in which they expect their services to be invoked. With standardization comes less complexity and less variance in the service invocation process. In one embodiment, the present invention takes advantage of these standard protocols to implement a less complex but more efficient and effective application proxy 120.

Figure 2:
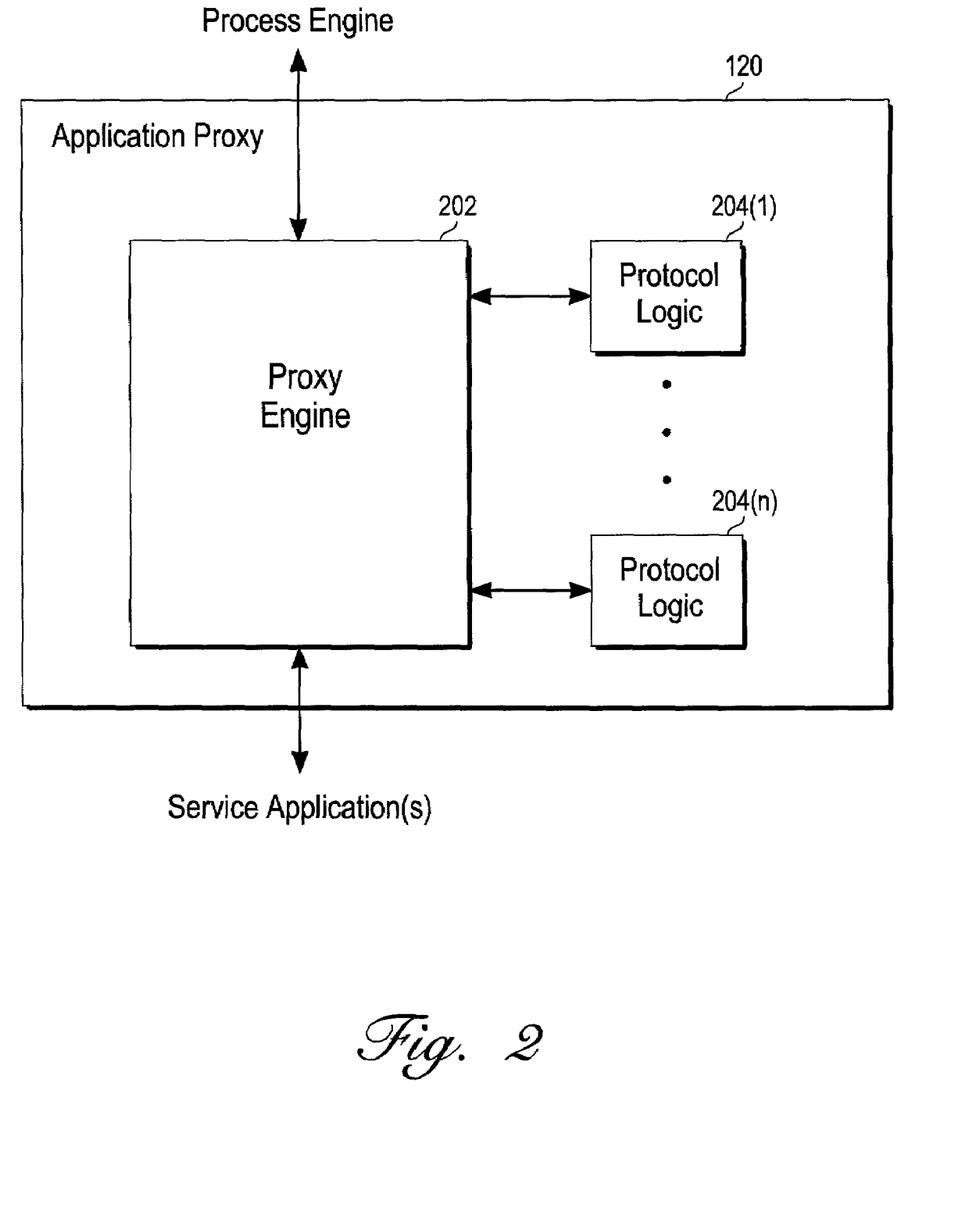
FIG. 2 is a more detailed block diagram of one embodiment of the application proxy of FIG. 1.

With reference to FIG. 2, there is shown a more detailed block diagram of an application proxy 120 in accordance with one embodiment of the present invention. As shown, the application proxy 120 comprises a proxy engine 202 and one or more sets of protocol logic 204. In one embodiment, each set of protocol logic 204 implements a particular protocol. For example, protocol logic 204(1) may implement the SOAP protocol, while protocol logic 204(n) may implement the ebXML protocol. As new protocols are developed, new sets of protocol logic 204 may be added to the application proxy 120. Basically, each set of protocol logic 204 has built into it an understanding of a particular protocol. Based upon this understanding, the protocol logic 204, when invoked by the proxy engine 202, knows how to interact with a service application 140 that also implements that protocol to invoke a service on that service application 140. For example, the protocol logic 204 knows which semantics to use to form a service invocation, which message formats are expected by the service application 140, and how message exchange should be conducted. Because an understanding of a protocol is already built into the protocol logic 204, there is no need for any customized XSL transformation rules. All a set of protocol logic 204 needs is some basic information about the particular service that it is to invoke. Once it has that, the protocol logic 204 will do all that is necessary to invoke the service.

The sets of protocol logic 204 bring to the application proxy 120 an understanding of one or more protocols. In contrast, the proxy engine 202 brings to the application proxy 120 an understanding of the overall process automation system. In one embodiment, it is the proxy engine 202 that interacts with the process engine 106 to receive information therefrom and to provide information thereto. In response to information received from the process engine 106, the proxy engine 202 also controls which set of protocol logic 204 is invoked. In addition, with help from the sets of protocol logic 204, the proxy engine 202 interacts with one or more of the various service applications 140 to invoke services thereon. Overall, the proxy engine 202 coordinates the interaction between the process engine 106, the sets of protocol logic 204, and the service applications 140. The operation of the proxy engine 202 will be described in greater detail in a later section.

Service Definition

As mentioned above, the sets of protocol logic 204 need some basic information about a service in order to properly invoke the service on a service application 140. In one embodiment, this basic information about a service is provided by a user at the time the user defines an activity. More specifically, when a user uses the definition tool 102 to define an activity that calls for the invocation of a service, in addition to providing all of the usual information for the activity, the user also provides a service definition for the service. In one embodiment, this service definition is associated with the activity definition, and comprises several basic sets of information that are common among all of the protocols.

In one embodiment, the service definition comprises the following information. First, the service definition comprises an indication of a protocol to be used to invoke the service. This indication may take on any form, such as the name of the protocol (e.g. SOAP). In the case where an application proxy 120 implements only one protocol, this indication can be implied. The service definition also comprises information specifying how the service can be accessed. This information may include, for example, a destination for the service (e.g. a universal resource identifier (URI)), a namespace, and the name of the service or method that is to be invoked. Basically, the access information enables the service to be located and uniquely invoked. In addition, the service definition comprises information for mapping the parameters of the service to the attributes of the activity. More specifically, any input parameters that are used by the service are mapped to selected activity attributes. Likewise, any output parameters produced by the service are mapped to selected activity attributes. This mapping information allows data values to be passed between the activity, the application proxy 120, and the service, and enables the proxy 120 to generate a proper service invocation and to map information returned by the service back into the attributes of the activity.

As an example, suppose that the service being invoked is an automated credit check and that the service takes in an input parameter "Name", an input parameter "SS Number", and produces an output parameter "Decision". Suppose further that the corresponding attributes associated with the activity are "Customer", "Customer Number", and "Status" (i.e. these are the attributes that are used by the activity in the process). In such a case, the mapping information may indicate the following:

| | |
|---|---|
| Input parameter: | Name maps to Customer |
| Parameter type: | String |
| Input parameter: | SS Number maps to Customer Number |
| Parameter type: | Integer |
| Output parameter: | Decision maps to Status |
| Parameter type: | Boolean |

As can be seen, this mapping information enables the application proxy 120 to directly correlate the attributes of the activity with the parameters of the service to generate a proper service invocation and to map information returned by the service back into the attributes of the activity.

In addition to the information set forth above, the service definition may further comprise some protocol-specific information. Some protocols may require more information than others. If so, that additional information may be specified in the service definition.

As can be seen from the above discussion, the information that is specified by a user in a service definition is fairly basic, both in terms of substance and technical complexity. Thus, a service definition need not be defined by a highly skilled technical specialist but rather may be provided by a relatively low-skilled end user. As a result, the present invention makes it possible for most end users to work with and exploit the capabilities of an application proxy 120.

Operation

Figure 3:
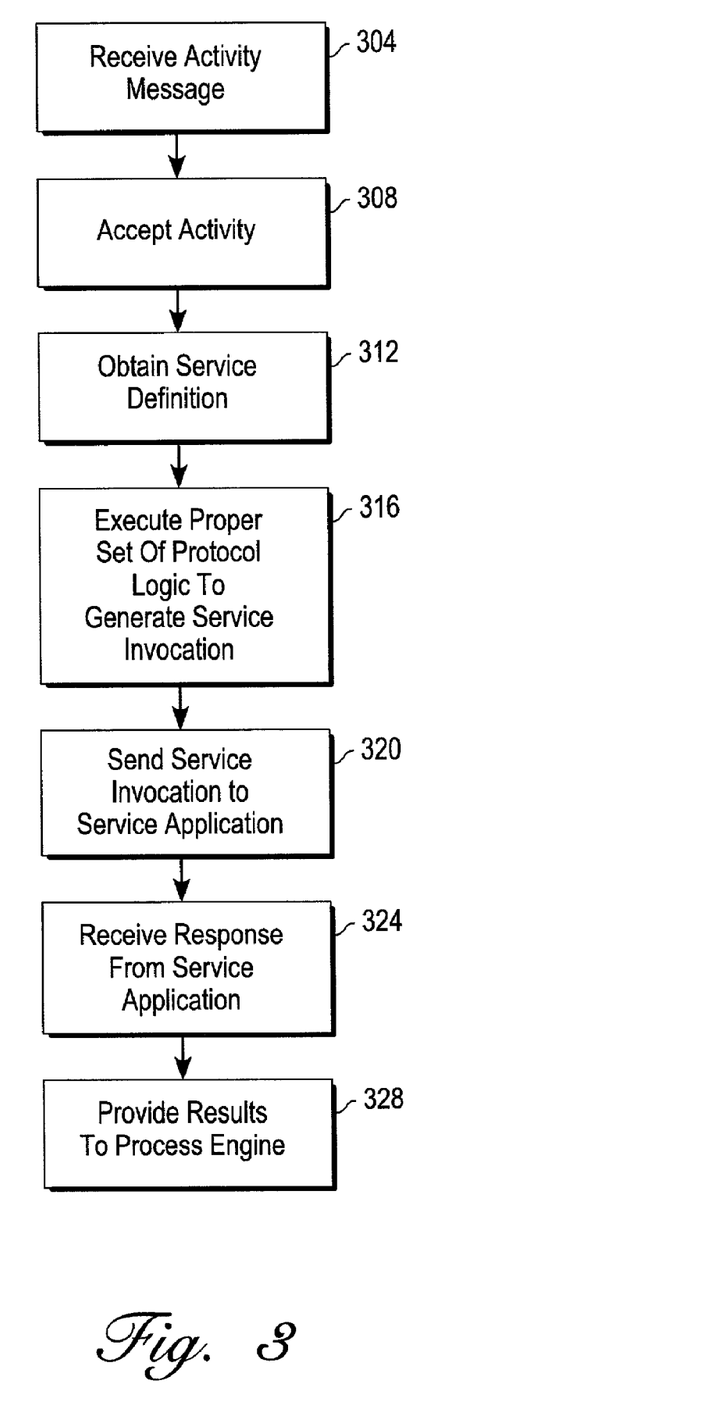
FIG. 3 is a flow diagram illustrating the operation of one embodiment of the process automation of FIG. 1.

With reference to the flow diagram shown in FIG. 3, the operation of one embodiment of the present invention will now be described. As noted above, once a process definition is fully defined for a process, the process engine 106 can use the process definition to implement and to manage the process. In one embodiment, the process engine 106 can implement multiple processes concurrently. At some point during the implementation of the processes, the process engine 106 will most likely encounter an activity that calls for the invocation of a service provided by a service application 140. When that occurs, the process engine 106 sends out an activity message indicating that that activity needs to be performed (i.e. the service needs to be invoked). This activity message may be sent to one or more of the application proxies 120 (FIG. 1).

Upon receiving (304) the activity message, an application proxy 120 can decide whether to accept responsibility for performing the activity. If the application proxy 120 decides not to perform the activity (e.g. it is currently busy), then in one embodiment it ignores the message. However, if the application proxy 120 decides to accept (308) the activity, then it sends an acceptance message to the process engine 106. The process engine 106 in turn informs the other application proxies 120 that the activity has been accepted. After the application proxy 120 accepts the activity, it proceeds to obtain (312) the service definition for the service that it is to invoke. As described above, in one embodiment, this service definition is included as part of the activity definition for the activity. The service definition may be provided to the application proxy 120 by the process engine 106 as part of the activity message, or the application proxy 120 may query the process engine 106 for it.

After the service definition is obtained, the proxy engine 202 (FIG. 2) of the application proxy 120 uses the information in the service definition to execute (316) one of the sets of protocol logic 204. More specifically, based upon the protocol indication in the service definition, the proxy engine 202 determines which set of protocol logic 204 implements that protocol, and executes that set of protocol logic 204. Thereafter, the executed set of protocol logic 204 proceeds to use the information in the service definition to generate a proper service invocation for invoking the service.

More specifically, using the parameter mapping information, the executed protocol logic 204 generates a service invocation that conforms to the semantics and message formats prescribed by the protocol. In addition, using the access information for the service, the executed protocol logic 104 includes in the service invocation all of the information needed to access the specific service on the specific service application 140. Overall, the executed protocol logic 204 performs all of the functions necessary for ensuring that the service invocation complies with the protocol that the executed protocol logic 204 implements.

After the service invocation is generated by the executed protocol logic 204, the proxy engine 202 sends (320) the service invocation into the network 130 (FIG. 1) to be delivered to the proper service application 140 for processing. Assuming the service is properly invoked, the service application 140 will at some point provide a response to the service invocation. When this response is received (324) by the proxy engine 202 of the application proxy 120, the proxy engine 202, with the aid of the executed protocol logic 204, extracts the results of the service invocation from the response. Then using the mapping information in the service definition, the proxy engine 202 maps the results back to the activity attributes. Thereafter, the proxy engine 202 provides (328) the results to the process engine 106 to update the process. The performance of the activity is thus completed.

In one embodiment, the same application proxy 120 may be used to perform different activities. That is, the same application proxy 120 may be used to invoke different services. This is true even if the different services require different protocols. For example, an application proxy 120 may received a first activity message, and respond by executing a first set of protocol logic 204(1) to generate and send a first service invocation to a first service application 140(1). The same application proxy 120 may receive a second activity message, and respond by executing a second set of protocol logic 204(n) to generate and send a second service invocation to a second service application 140(n). Thus, the application proxy 120 is quite versatile and may be used to invoke many different services on many different service applications using various protocols.

Thus far, the service definition has been described as being included as part of the activity definition. It should be noted, though, that if so desired, the service definition could be defined in the application proxy 120 instead. In such a case, an activity could contain a reference to the service definition (e.g. an application code) such that when the activity is performed by the application proxy 120, the application proxy 120 knows to obtain the service definition from its own configuration information. This and many other alternate implementations are within the scope of the present invention.

Hardware Overview

Figure 4:
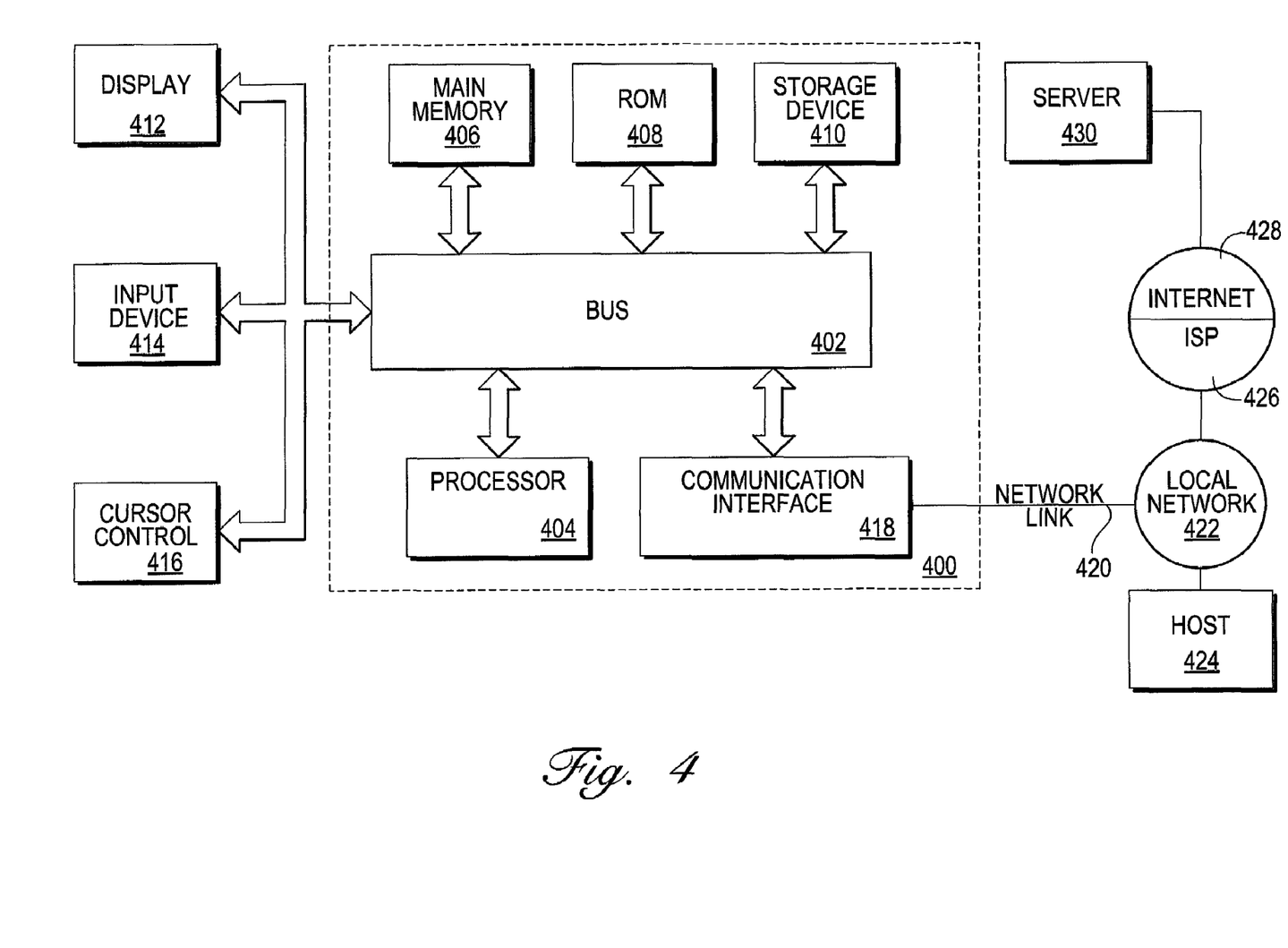
FIG. 4 is a hardware block diagram of a computer system in which one embodiment of the present invention may be implemented.

In one embodiment, the various components of system 100 are implemented as sets of instructions executable by one or more processors. The components may be implemented as part of an object oriented programming system, including but not limited to the JAVA™ programming system manufactured by Sun Microsystems, Inc. of Palo Alto, Calif. FIG. 4 shows a hardware block diagram of a computer system 400 in which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 may also be further used to store temporary variables or other intermediate information during execution of instructions by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

According to one embodiment, the functionality of the present invention is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or electromagnetic waves, such as those generated during radio-wave, infra-red, and optical data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage device 410, or other non-volatile storage for later execution. In this manner, computer system 400 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the appended claims.

What is claimed is:

1. In a process comprising at least one activity, a computer implemented method for performing an activity, comprising:
    an application proxy receiving a first message, from a process management engine, to perform a first activity which calls for invocation of a first service provided by a first service application, said first service being invocable using a first protocol, and said first service, when invoked, provides a first set of one or more results of performing said first service;
    the application proxy obtaining a service definition for said first service, wherein the service definition for said first service comprises mapping information that maps one or more attributes associated with said first activity to one or more parameters used by said first service, wherein said first service definition for said first service comprises an indication that said first protocol is to be used to invoke said first service;
    the application proxy selecting a first set of logic, from a plurality of sets of logic, based upon said indication in said service definition for said first service, wherein said first set of logic implements said first protocol;
    the application proxy executing said first set of logic which implements said first protocol to generate a first service invocation, wherein said first service invocation is generated based upon, at least a portion of, said mapping information in the service definition, and is in compliance with said first protocol;
    the application proxy sending said first service invocation to said first service application to invoke said first service;
    the application proxy receiving a reply from said first service application which comprises said first set of one or more results of performing said first service;
    the application proxy providing at least a portion of said first set of one or more results of performing said first service to said process management engine to complete performance of said first activity;
    the application proxy receiving a second message to perform a second activity which calls for invocation of a second service provided by a second service application, wherein said second service, when invoked, provides a second set of one or more results of performing said second service;
    the application proxy obtaining a service definition for said second service, said service definition for said second service comprising an indication that a second protocol is to be used to invoke said second service;
    the application proxy selecting a second set of logic based upon said indication in said service definition for said second service, said second set of logic implementing said second protocol;
    the application proxy executing said second set of logic to generate a second service invocation, wherein said second service invocation is generated based upon at least a portion of said service definition for said second service, and is in compliance with said second protocol;
    the application proxy sending said second service invocation to said second service application to invoke said second service;
    the application proxy receiving a reply from said second service application which comprises said second set of one or more results; and
    the application proxy providing at least a portion of said second set of one or more results to said process management engine to complete performance of said second activity.

2. The method of claim 1, wherein said protocol is an industry standard protocol.

3. The method of claim 2, wherein said protocol is SOAP (simple object access protocol).

4. The method of claim 2, wherein said protocol is ebXML.

5. The method of claim 1, wherein said activity has an activity definition associated therewith, and wherein said activity definition comprises said service definition.

6. The method of claim 1, wherein said service definition comprises an indication that said protocol is to be used to invoke said service.

7. The method of claim 1, wherein said service definition comprises access information for accessing said service.

8. The method of claim 7, wherein said access information comprises a URI (universal resource identifier).

9. The method of claim 7, wherein said access information comprises a service name.

10. A computer readable medium comprising instructions which, when executed by one or more processors, cause the one or more processors to perform an activity, said computer readable medium comprising:
    instructions for causing one or more processors to receive, at an application proxy, a first message, from a process management engine, to perform a first activity which calls for invocation of a first service provided by a first service application, said first service being invocable using a first protocol, and said first service, when invoked, provides a first set of one or more results of performing said first service;
    instructions for causing one or more processors to obtain, at the application proxy, a service definition for said first service, wherein the service definition for said first service comprises mapping information that maps one or more attributes associated with said first activity to one or more parameters used by said first service, wherein said service definition for said first service comprises an indication that said first protocol is to be used to invoke said first service;
    instructions for causing one or more processors to select, at the application proxy, a first set of logic, from a plurality of sets of logic, based upon said indication in said service definition for said first service, wherein said first set of logic implements said first protocol;
    instructions for causing one or more processors to execute, at the application proxy, said first set of logic which implements said first protocol to generate a first service invocation, wherein said first service invocation is generated based upon, at least a portion of, mapping information in the said service definition for said first service, and is in compliance with said first protocol;

instructions for causing one or more processors to send, at the application proxy, said first service invocation to said first service application to invoke said first service;

instructions for causing one or more processors to receive, at the application proxy, a reply from said first service application which comprises said first set of one or more results of performing said first service;

instructions for causing one or more processors to provide, at the application proxy, at least a portion of said first set of one or more results of performing said first service to said process management engine to complete performance of said first activity;

instructions for causing one or more processors to receive, at the application proxy, a second message to perform a second activity which calls for invocation of a second service provided by a second service application, wherein said second service, when invoked, provides a second set of one or more results of performing said second service;

instructions for causing one or more processors to obtain, at the application proxy, a service definition for said second service, said service definition for said second service comprising an indication that a second protocol is to be used to invoke said second service;

instructions for causing one or more processors to select, at the application proxy, a second set of logic based upon said indication in said service definition for said second service, said second set of logic implementing said second protocol;

instructions for causing one or more processors to execute, at the application proxy, said second set of logic to generate a second service invocation, wherein said second service invocation is generated based upon at least a portion of said service definition for said second service, and is in compliance with said second protocol;

instructions for causing one or more processors to send, at the application proxy, said second service invocation to said second service application to invoke said second service;

instructions for receiving, at the application proxy, a reply from said second service application which comprises said second set of one or more results; and instructions for providing, at the application proxy, at least a portion of said second set of one or more results to said process management engine to complete performance of said second activity.

11. The computer readable medium of claim 10, wherein said protocol is an industry standard protocol.

12. The computer readable medium of claim 11, wherein said protocol is SOAP (simple object access protocol).

13. The computer readable medium of claim 11, wherein said protocol is ebXML.

14. The computer readable medium of claim 10, wherein said activity has an activity definition associated therewith, and wherein said activity definition comprises said service definition.

15. The computer readable medium of claim 10, wherein said service definition comprises an indication that said protocol is to be used to invoke said service.

16. The computer readable medium of claim 10, wherein said service definition comprises access information for accessing said service.

17. The computer readable medium of claim 16, wherein said access information comprises a URL (universal resource locator).

18. The computer readable medium of claim 16, wherein said access information comprises a service name.

* * * * *